United States Patent [19]
Borland et al.

[11] Patent Number: 5,474,104
[45] Date of Patent: Dec. 12, 1995

[54] REFUELING CHECK VALVE FOR COMPRESSED NATURAL GAS POWERED VEHICLES

[75] Inventors: Robin N. Borland, McMurray; David E. Hughes, Pittsburgh; William S. Kalaskie, McMurray; John Piscatelli, Pittsburgh; Paul Rafalowski, Erie; Timothy R. Stiffy, Bentleyville; Paul L. Wellener, III, Pittsburgh, all of Pa.

[73] Assignee: Superior Valve Company, Washington, Pa.

[21] Appl. No.: 372,960

[22] Filed: Jan. 17, 1995

[51] Int. Cl.$^6$ ............................................ F16K 17/168
[52] U.S. Cl. .................. 137/381; 137/351; 137/544; 137/599; 251/155; 251/176; 251/368
[58] Field of Search ............................. 137/599, 599.1, 137/599.2, 351, 354, 572, 588, 381, 544; 251/144, 151, 155, 176, 368

[56] References Cited

U.S. PATENT DOCUMENTS

| | | | |
|---|---|---|---|
| 848,178 | 3/1907 | Kingsley | 137/599 X |
| 873,984 | 12/1907 | Bobrick | 137/599 |
| 2,111,430 | 3/1938 | Lamar | 137/599 X |
| 4,016,899 | 4/1977 | Fletcher | 137/599 |
| 4,307,748 | 12/1981 | Mathias | 137/381 |
| 4,848,394 | 7/1989 | Rothschild | 251/144 X |
| 5,351,726 | 10/1994 | Diggins | 137/599 X |

FOREIGN PATENT DOCUMENTS

| | | | |
|---|---|---|---|
| 560772 | 4/1957 | Italy | 137/599 |

OTHER PUBLICATIONS

Parker Hannifin Corporation brochure, Nov. 1992.
Stäubli Corporation brochure, Mar. 1992.
Sherex Industries brochure, Sep. 1991.
Sherex Industries brochure, Apr. 1992.
Sherex Industries brochure, Dec. 1991.

*Primary Examiner*—Stephen M. Hepperle
*Attorney, Agent, or Firm*—Killworth, Gottman, Hagan & Schaeff

[57] ABSTRACT

A refueling check valve assembly which provides for rapid, efficient, and safe refueling of compressed natural gas powered vehicles is provided and includes a receptacle adapted to mate with a fuel supply nozzle and a valve body having first and second gas flow passages therethrough. The respective first ends of the first and second gas flow passages communicate with the receptacle, while the respective second ends of the first and second gas flow passages are adapted to communicate with a fuel storage vessel, typically through a fuel supply line. A check valve is positioned in the first gas flow passage of the valve body and is normally biased into a closed position to prevent the flow of gas through the first gas flow passage. The check valve opens in response to a flow of fuel under pressure, permitting the flow of gas to the fuel storage vessel. A by-pass valve is also provided in the second gas flow passage in the valve body for depressurizing the fuel system prior to servicing.

9 Claims, 3 Drawing Sheets

REFUELING CHECK VALVE FOR COMPRESSED NATURAL GAS POWERED VEHICLES

BACKGROUND OF THE INVENTION

This invention relates to a refueling check valve assembly, and more particularly to such a valve assembly having a manual by-pass feature for use in compressed natural gas (CNG) powered vehicles.

Because of environmental concerns and emissions laws and regulations, manufacturers of motor vehicles are searching for a clean burning and cost efficient fuel to use as an alternative to gasoline. Natural gas is one candidate for such a purpose, and many vehicles have been converted to natural gas as a fuel source. Typically, the natural gas is stored on board the vehicle in compressed form in one or more pressurized cylinders. After the fuel is expended, there is a need to be able to refill the cylinders under pressure in a safe, fast, and efficient manner.

Refueling valves which control the supply of compressed natural gas (CNG) to the cylinders in a vehicle are exposed to large variations in environmental conditions. For example, wide variations in temperatures and pressures may be encountered. During refueling operations, instantaneous temperature drops of at least 50° F. are common. Temperatures may exceed ambient by 20° F. or more toward the end of refueling. This variation in temperature, as well as the rapid increases in pressure during refueling, may result in the nominal working pressure in a gas cylinder varying from several hundred up to several thousand pounds per square inch (psi). Thus, the refueling valve must be able to handle high gas pressures up to 4,500 psi without leakage or failure.

Additionally, nozzles transferring the compressed natural gas fuel through the refueling valves under these high pressures must be able to be fully depressurized prior to being disconnected from the refueling valves. Also, in view of the long lives of the vehicles and the potential for many thousands of refuelings over the life of a vehicle, the refueling valves must be able to withstand many thousands of refueling cycles. Finally, if servicing or replacement of a valve is necessary, the system must be able to be vented and depressurized readily.

Currently, refueling valves are designed with a receptacle adapted to mate with a fueling nozzle and have a check valve positioned within the receptacle. Such designs, however, may be difficult to service or replace. Accordingly, the need exists in this art for a refueling valve which provides for easy and safe refueling and yet is convenient to service or replace.

SUMMARY OF THE INVENTION

The present invention meets that need by providing a refueling check valve assembly which provides for rapid, efficient, and safe refueling of compressed natural gas powered vehicles. The check valve assembly also permits depressurization of the vehicle fuel system prior to servicing and maintenance thereof. In accordance with one aspect of the present invention, the refueling check valve assembly includes a receptacle adapted to mate with a fuel supply nozzle and a valve body having first and second gas flow passages therethrough. The respective first ends of the first and second gas flow passages communicate with the receptacle, while the respective second ends of the first and second gas flow passages are adapted to communicate with a fuel storage vessel, typically through a fuel supply line.

A check valve is positioned in the first gas flow passage of the valve body and is normally biased into a closed position to prevent the flow of gas through the first gas flow passage. The check valve opens in response to a flow of fuel under pressure, permitting the flow of gas to the fuel storage vessel or vessels.

In a preferred embodiment of the invention, the refueling check valve assembly further includes a by-pass valve in the second gas flow passage in the valve body. The by-pass valve is normally in a closed position blocking the flow of gas through the second gas flow passage. Where servicing or replacement of one or more parts of the assembly is required, the by-pass valve may be opened to permit a flow of gas from the fuel storage vessel back through the receptacle to depressurize a vehicle's fuel system prior to maintenance.

To maintain a sealing load on the by-pass valve, the by-pass valve includes a resilient gasket on the end of a valve stem, with a Belleville spring positioned between the stem and valve seat which exerts a live sealing load on the gasket. Further, the gasket is preferably made of a material which does not relax or compress over time such as a polyamide to insure that the by-pass valve remains sealed.

The receptacle may also include a filter for removing particulate matter from the fuel. Because of the positioning of the check valve within the valve body, the receptacle is not under pressure and can be removed readily for service and/or replacement of the filter as required. The assembly may also include a dust cap adapted to fit over the end of the receptacle to protect it from environmental contaminants, scratches, and abrasions between uses.

Accordingly, it is a feature of the present invention for a refueling valve which provides for easy and safe refueling and yet is convenient to service or replace. This, and other features and advantages of the present invention will become apparent from the following detailed description, the accompanying drawings, and the appended claims.

DETAILED DESCRIPTION OF THE PREFERRED EMBODIMENT

Figure 1:
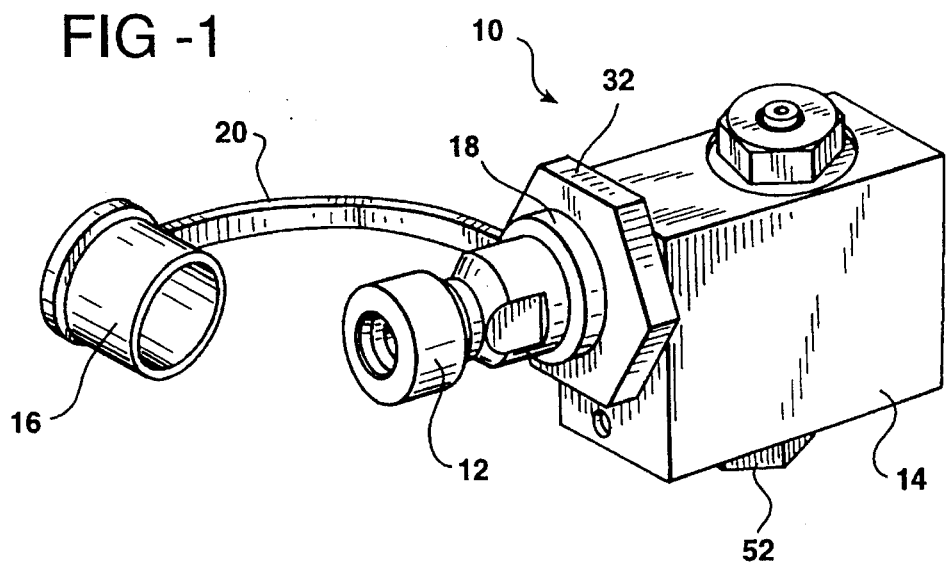
FIG. 1 is a perspective view of the refueling check valve assembly of the present invention, including optional dust cap.

As shown in FIG. 1, refueling check valve 10 of the present invention includes a receptacle 12 and a valve body 14. Both receptacle 12 and valve body 14 are preferably manufactured of suitable corrosion-resistant metals such as anodized aluminum, stainless steel, or brass. An optional dust cap 16, fabricated of a suitable resilient plastic or the like, is designed to fit over the end of receptacle 12 to protect it from environmental contaminants, nicks, and abrasions between fuel refuelings. Dust cap 16 is secured to receptacle 12 by any suitable means such as by manufacturing the dust cap to have an encircling ring 18 which frictionally fits over the body of receptacle 12 and a tether 20 connecting ring 18 and cap 16. It will be apparent that other constructions may be used to secure dust cap 16 to the receptacle.

Figure 2:
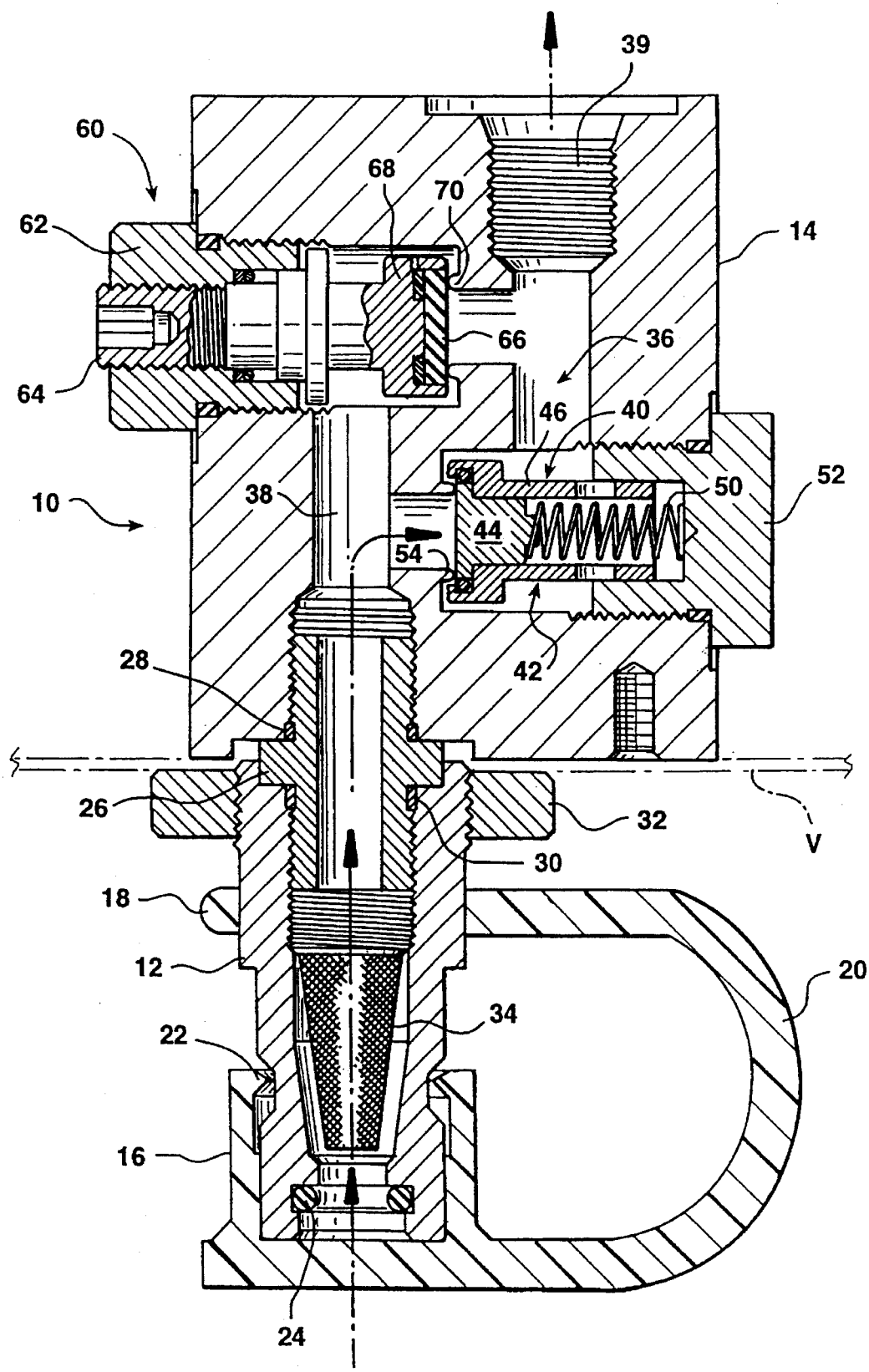
FIG. 2 is a side view, in cross section, of the refueling check valve assembly.

As best shown in FIG. 2, plastic dust cap 16 includes a retaining lip 22 which provides a snap fit over the end of receptacle 12. As shown, by fabricating dust cap 16 of a suitable resilient plastic and reducing the thickness of the wall of the cap adjacent the lip, the cap wall will flex easily to permit retaining lip 22 to slide off and onto receptacle 12.

Receptacle 12 preferably has an exterior profile which will mate with standard CNG fuel nozzles. For example, the profile may be in compliance with ANSI draft specification NGV 1 (Sep. 16, 1993) for fueling connection devices. Internally, the receptacle should include a sealing surface such as provided by an internal resilient O-ring 24. Preferably, O-ring 24 is fabricated of a nitrile rubber or other suitable material designed for low temperature resiliency. Receptacle 12 is connected to valve body 14 via a threaded adapter fitting 26 which includes external threads on both ends thereof which mate with corresponding internal threads on the receptacle and valve body. Resilient O-rings 28, 30 may be used to insure a gas-tight seal. Again, it is preferred that the O-rings seals used in the check valve assembly be fabricated of nitrile rubber or other suitable material for good low temperature performance. A jam nut 32 secures the assembly 10 to an exterior surface of a vehicle wall V so that valve body 14 is interior of the vehicle wall while receptacle 12 extends outwardly from the wall for easy access for refueling.

Within receptacle 12 an optional filter 34 may be positioned directly in the flow path of the refueling compressed gas. Filter 34 entraps any particles or contaminants in the fuel and insures that the compressed gas fuel in the system is clean. Further, by entrapping any particulate matter in the filter, such particulates are prevented from interfering with the sealing of the check valve in valve assembly 10 or with any other valves throughout the fuel system of the vehicle.

Referring again to FIG. 2, valve body 14 includes first and second gas flow passages 36 and 38, respectively, therein. An internally threaded opening 39 is adapted to mate with a fuel supply line and provides access to a fuel tank or tanks (not shown) within the vehicle. Within first gas flow passage 36 is check valve 40 which controls the flow of compressed gas between receptacle 12 and the fuel tank. First gas flow passage 36 includes a first end communicating with receptacle 12 through hollow fitting 26. The opposite (second) end of gas flow passage 36 communicates through opening 39 with one or more fuel storage tanks (not shown).

Figure 3:
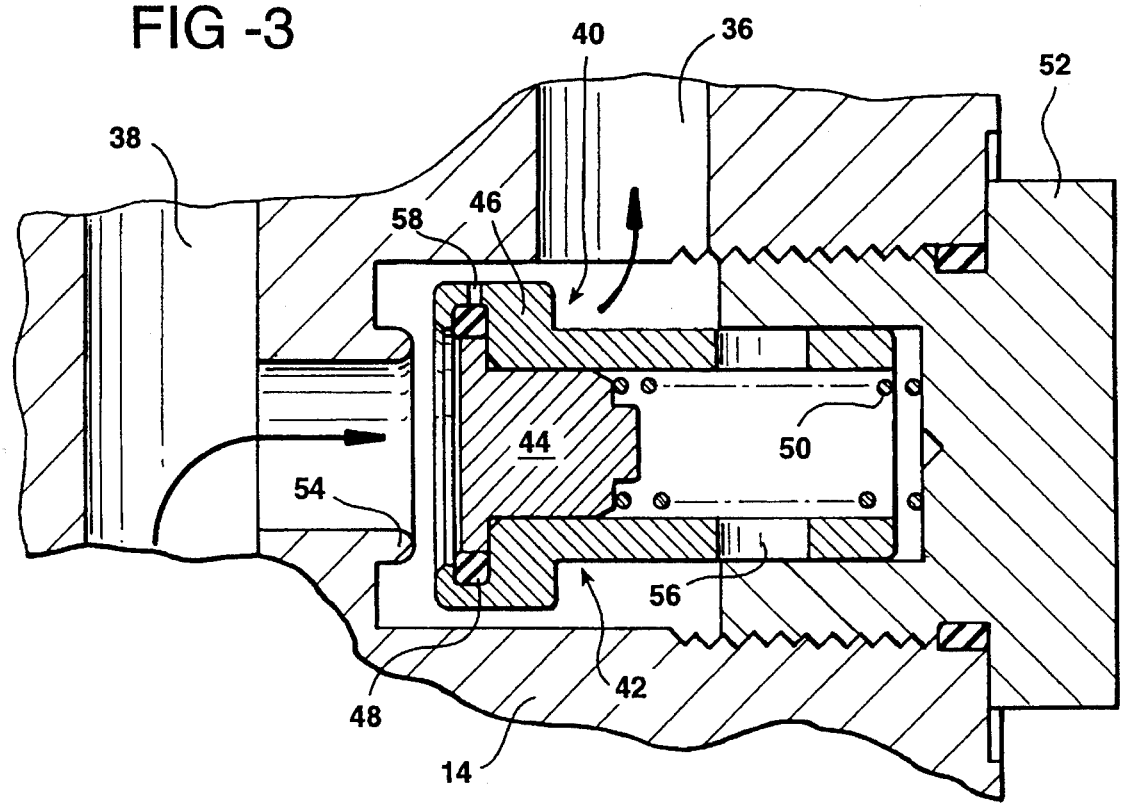
FIG. 3 is an enlarged cross-sectional view of the check valve portion of the valve assembly.

Check valve 40, as best shown in FIG. 3, includes a poppet assembly 42 comprising an insert 44, insert holder 46, a resilient O-ring 48 for sealing, spring 50, and bonnet 52. Insert 44 is adapted to seat against and, in conjunction with O-ring 48, seal gas flow passage 36 at valve seat 54. Both insert holder 46 and insert 44 are fabricated of a suitable gas-impervious and corrosion-resistant material such as stainless steel. Insert 44 may alternatively be fabricated of a plastic such as a polyamide to serve as a back-up seal against valve seat 54.

Threaded bonnet 52 provides access to popper assembly 42 for maintenance purposes. Bonnet 52 also provides a surface against which spring 50 pushes to bias check valve 40 into its normally closed position as shown in FIG. 1. Check valve 40 also includes gas bleed holes 56, and 58, respectively. Gas bleed hole 56 provides a path to prevent gas entrapment while the popper is moving from a closed to an open position. Gas entrapment could cause the poppet to oscillate (sometimes termed "chatter"), causing excessive wear and poor flow performance. Gas bleed hole 58 prevents high pressure gas from becoming entrapped behind O-ring 48 and potentially pushing it out of position when check valve 40 is open. Gas bleed hole 58 also provides access for gas to get behind O-ring 48 when check valve 40 is in the closed position to assist in the sealing function of the O-ring.

Also included in refueling check valve assembly 10 is a by-pass valve 60 located in second gas flow passage 38. Second gas flow passage 36 includes a first end communicating with receptacle 12 through hollow fitting 26. The opposite (second) end of second gas flow passage 38 communicates through opening 39 with one or more fuel storage tanks (not shown).

Figure 4:
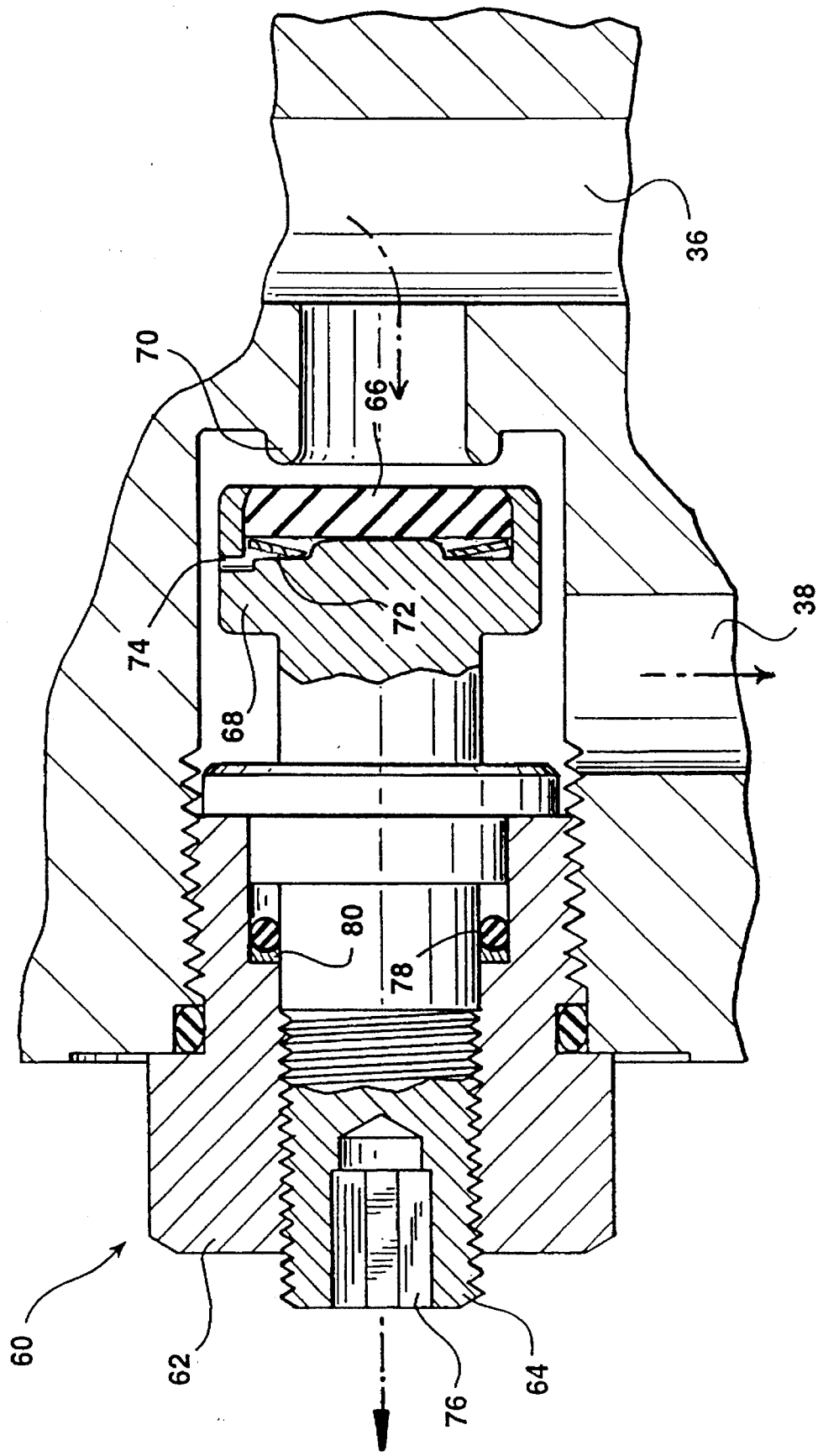
FIG. 4 is an enlarged cross-sectional view of the by-pass valve portion of the valve assembly.

By-pass valve 60 provides a means to bleed down all compressed gas in the fuel system through receptacle 12 prior to servicing and maintenance of the fuel system. As best shown in FIG. 4, by-pass valve 60 includes a bonnet 62, an internally-threaded stem 64, a sealing gasket 66, and a gasket holder 68. An O-ring 78 and backup ring 80 together act to seal valve stem 64 and bonnet 62. As is conventional, backup ring 80 is manufactured of a higher durometer hardness rubber to prevent the softer O-ring from extruding through the gap between the valve stem 64 and bonnet 62. By-pass valve 60 is normally sealed against valve seat 70 in second gas flow passage 38.

To insure that a gas-tight seal is maintained over time, by-pass valve 60 includes a Belleville spring or washer 72 which exerts an active or "live" load against gasket 66. Gasket 66 is preferably fabricated of a resilient polymer such as a polyamide (for example Vespel (trademark), available from dupont) which resists relaxation over time. A bleed hole 74 is provided adjacent Belleville spring 72 in gasket holder 68. Bleed hole 74 prevents gas from becoming entrapped behind gasket 66, which could otherwise cause gasket 66 to be pushed out of position when by-pass valve 60 is opened.

In operation, dust cap 16 is removed from the end of receptacle 12 and a compatible compressed natural gas supply nozzle (not shown) is attached to the end of receptacle 12. Because of the standard exterior profile of receptacle 12, any standard nozzle, including both ball-lock and jaw-lock style nozzles, may be used. Additionally, the exterior profile of receptacle 12 may be designed so that only properly rated nozzles may be attached.

Once attached, gas flow is initiated through the nozzle and receptacle 12 and into first gas flow passage 36. The pressure of the gas pushes against seal insert 44 in check valve 40 to open the valve and permit gas to flow through the check valve and opening 39 and into the fuel tank or tanks (not shown). By-pass valve 60 remains locked down, sealing second gas flow passage 38. Once the fuel tanks are recharged, gas flow is turned off, and check valve 40 automatically closes from the closing force exerted by spring 50. Receptacle 12 is then depressurized via a three-way valve (not shown) in the nozzle which is opened to vent the small amount of gas in receptacle 12. The nozzle is then detached from the end of receptacle 12. Because of the unique design, receptacle 12 in not pressurized except during refueling; at all other times, it is not under gas pressure. This construction provides a major advantage over prior art assemblies which have a check valve located in the receptacle. In those assemblies, the receptacle remains pressurized at all times, and, if sheared off in a crash, could release the compressed gas from the fuel storage tanks. Also, a pressurized receptacle complicates routine maintenance and service on a check valve assembly.

When service or maintenance of the valve assembly is needed, dust cap 16 is removed from the end of receptacle 12, and a vent pipe or line (not shown) is attached to the receptacle. Stem 64 of by-pass valve 60 is rotated using an Allen wrench or other special tool which is adapted to fit the recess 76 in stem 64. Rotation is continued until gasket 66 is backed away from valve seat 70 and gas begins to flow through second gas flow passage 38. Further rotation may be used to adjust to a desired bleed-down flow rate of gas from the fuel system. After compressed gas is completely bled from the fuel system, by-pass valve 60 is closed and the vent pipe is removed.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A refueling check valve assembly for a compressed natural gas vehicle comprising:
   a) a receptacle adapted to mate with a fuel supply nozzle;
   b) a valve body having first and second gas flow passages therethrough, the respective first ends of said first and second gas flow passages communicating with said receptacle, and the respective second ends of said first and second gas flow passages adapted to communicate with a fuel storage vessel;
   c) a check valve in said first gas flow passage of said valve body, said check valve being normally biased into a closed position to prevent the flow of gas through said first gas flow passage and which opens in response to a flow of fuel under pressure; and
   d) a by-pass valve in said second gas flow passage in said valve body, said by-pass valve being operable to permit a flow of gas from said fuel storage vessel through said receptacle.

2. The refueling check valve of claim 1 in which said receptacle includes a filter for removing particulate matter from the fuel.

3. The refueling check valve of claim 1 including a dust cap adapted to fit over an end of said receptacle.

4. The refueling check valve of claim 1 in which said by-pass valve includes a gasket and a Belleville spring which exerts a sealing load on said gasket.

5. The refueling check valve of claim 4 in which said gasket is comprised of a polyamide.

6. A refueling check valve assembly for a compressed natural gas vehicle comprising:
   a) a receptacle adapted to mate with a fuel supply nozzle, said receptacle including a filter for removing particulate matter from the fuel;
   b) a valve body having first and second gas flow passages therethrough, the respective first ends of said first and second gas flow passages communicating with said receptacle, and the respective second ends of said first and second gas flow passages adapted to communicate with a fuel storage vessel; and
   c) a check valve in said first gas flow passage of said valve body, said check valve being normally biased into a closed position to prevent the flow of gas through said first gas flow passage and which opens in response to a flow of fuel under pressure.

7. The refueling check valve of claim 6 including a by-pass valve in said second gas flow passage in said valve body, said by-pass valve being operable to permit a flow of gas from said fuel storage vessel through said receptacle.

8. The refueling check valve of claim 7 in which said by-pass valve includes a gasket and a Belleville spring which exerts a sealing load on said gasket.

9. The refueling check valve of claim 8 in which said gasket is comprised of a polyamide.

* * * * *